May 12, 1970  A. G. TUCCI  3,511,424
PLEAT FORMING DEVICE AND PROCESS
Filed April 22, 1968  10 Sheets-Sheet 1

INVENTOR
ANTHONY G. TUCCI

BY
ATTORNEY

INVENTOR
ANTHONY G. TUCCI

ATTORNEY

May 12, 1970  A. G. TUCCI  3,511,424
PLEAT FORMING DEVICE AND PROCESS
Filed April 22, 1968  10 Sheets-Sheet 3

INVENTOR
ANTHONY G. TUCCI

BY

ATTORNEY

May 12, 1970 A. G. TUCCI 3,511,424
PLEAT FORMING DEVICE AND PROCESS
Filed April 22, 1968 10 Sheets-Sheet 4

INVENTOR
ANTHONY G. TUCCI

BY

ATTORNEY

May 12, 1970 A. G. TUCCI 3,511,424
PLEAT FORMING DEVICE AND PROCESS
Filed April 22, 1968 10 Sheets-Sheet 5

INVENTOR
ANTHONY G. TUCCI

ATTORNEY

United States Patent Office 3,511,424
Patented May 12, 1970

3,511,424
PLEAT FORMING DEVICE AND PROCESS
Anthony G. Tucci, 9602 103 Ave.,
Ozone Park, N.Y. 11417
Filed Apr. 22, 1968, Ser. No. 723,334
Int. Cl. A41h 43/00
U.S. Cl. 223—34                                               8 Claims

ABSTRACT OF THE DISCLOSURE

A method of forming and setting pleats in a workpiece. A device for forming pleats in a workpiece comprising a workpiece presser plate adapted to overlie a portion of a conveyor belt passing through said device and carrying a workpiece to be pleated, said presser plate adapted to prevent a portion of said workpiece from becoming pleated, means for lifting a portion of said workpiece off said conveyor, means for forcing the lifted portion of said workpiece over the portion of said workpiece carried on said conveyor against which said presser plate bears, means for keeping said lifted portion of said workpiece in a generally planar position relative to said conveyor and said portion of said workpiece carried on said conveyor, means for maintaining a crease between said portion of said workpiece carried on said conveyor and said lifted portion of said workpiece, and means for placing said lifted portion over the unlifted portion in surface-to-surface relationship.

BACKGROUND OF THE INVENTION

Field of the invention

This invention relates to an apparatus for making pleats in a fabric. More particularly, this invention relates to an apparatus for making a plurality of pleats in a fabric. In an important aspect of this invention, an apparatus for making pleats in a fabric is provided in combination with a fabric pleat setting means. The present invention provides both knife pleats and/or box pleats depending upon the specific embodiment of the invention chosen.

Discussion of the prior art

Heretofore several means have been provided for making pleats in a workpiece. It is the present practice, for instance, in the making of pleats for a cummerbund or the like to fold the workpiece in accordance with guide fold lines on a piece of paper. Thereafter, the folded workpiece is placed into a steamchest or oven where the pleat is set. Obviously, this technique is very cumbersome and slow and entails much time per workpiece on the part of the operator. Since labor accounts for well over half of the cost involved in making a garment or garment accessory, this method is undesirable. Thus, it should be apparent that if the pleat making operation can be done on a continuous basis in essentially one step on the part of the operator; that the cost per finished product will be substantially less. Thus if the time involved in the pleat making operation can be markedly decreased without sacrificing quality in the finished product, the costs of making the garment will be dramatically reduced.

The prior art and currently practiced method in addition to being time consuming does not always provide uniform pleats with constant pleat depth and distance between pleats, largely because of the element of human error involved in the process. Additionally, quality control is essentially lacking in products made by this method because the quality is heavily dependent upon the operator.

SUMMARY OF THE INVENTION

Objects of the invention

It is a primary object of this invention to provide a method and apparatus for pleating fabrics and especially for imparting multiple pleats in a fabric.

It is another primary object of this invention to provide such a method and apparatus for imparting a pleat in a fabric or multiple pleats in a fabric wherein sharp even pleats having constant pleat depth and distance between pleats are provided.

It is yet another object of this invention to provide such a method and apparatus for imparting pleats in a fabric which is in intimate combination with a pleat setting means.

These and other objects and advantages will become apparent from the following description accompanying drawings and appended claims.

STATEMENT OF THE INVENTION

Broadly this invention contemplates a method for forming and setting pleats in a fabric which comprises continuously passing a length of workpiece through a pleat-forming device said workpiece carried on a conveyor and continuously removing the pleated workpiece from said device and immediately thereafter passing said conveyor carrying said pleated workpiece beneath a heated iron whose lower surface abutts said workpiece and exerts pressure thereagainst and continuously removing the pleated and set workpiece from beneath said iron.

The invention further relates to apparatuses for forming the pleats in the workpiece. One of such apparatuses or devices which is adapted to form a knife pleat comprises a workpiece presser plate adapted to overlie a portion of a conveyor belt passing through the device and carrying a workpiece to be pleated, said presser plate adapted to prevent a portion of the workpiece from becoming pleated, means for lifting a portion of said workpiece off said conveyor, means for forcing the lifted portion of said workpiece over the portion of the workpiece carried on the conveyor against which said presser plate bears, means for keeping said lifted portion of said workpiece in a generally planar position relative to said conveyor and said portion of said workpiece carried on said conveyor, means for maintaining a crease between said portion of said workpiece carried on said conveyor and said lifted portion of said workpiece, and means for placing said lifted portion over the unlifted portion in surface-to-surface relationship.

In a particularly desirable embodiment, this invention contemplates a device for forming a knife pleat in a workpiece which comprises a pressor plate adapted to overlie a portion of a conveyor belt passing through the device and carrying a workpiece to be pleated, an upwardly beveled leg positioned against said conveyor for lifting a portion of said workpiece off said conveyor, said leg running the major portion of the length of said device and at its opposite end being downwardly beveled, said leg supporting a generally horizontal plate, a first finger affixed to said plate extending over the portion of said workpiece carried on said conveyor beneath said presser plate and being downwardly sloping to said portion of said workpiece carried on said conveyor, a second finger extending from said presser plate in generally the same direction and bearing against workpiece therebeneath, said first finger overlapping said second finger, a plate overlying said first finger and said second finger and rearwardly sloping downward generally parallel to said first finger.

The present invention also contemplates such a pleat forming device positioned on the conveyor, an iron being positioned behind said device to set pleats formed by the device in which case the conveyor functions not only to carry the workpiece through the pleat forming device but also to carry the pleated workpiece under the iron where the pleat is set.

As indicated above an important embodiment of this invention is a multiple pleat making device. Multiple pleats are formed by employing a plurality of single pleat making devices positioned in series along the length of the conveyor but at different positions across the width of the conveyor.

DESCRIPTION OF THE DRAWINGS

The invention in its various forms can be more readily understood and appreciated by reference to the accompanying drawings in which:

In the above drawings, some parts have been exaggerated to facilitate understanding the invention and for purposes of clarity. Since the device employs fingers which taper into knife edges at the point at which the pleats are completed, these knife edges have been shown several times larger than they actually are so that the folding of the various workpieces is clear. FIG. 17 is thus seen to be a magnification of the actual device utilized. Similarly FIG. 22 is a magnified view of FIG. 21 with parts omitted so that the cloth folding action can be readily understood. The workpiece is shown in several sectional drawings as a solid black line to facilitate distinguishing it from a conveyor belt also of textile composition on which at least a portion of it rides.

DISCUSSION OF PREFERRED EMBODIMENTS

Knife pleat making device

Figure 3:
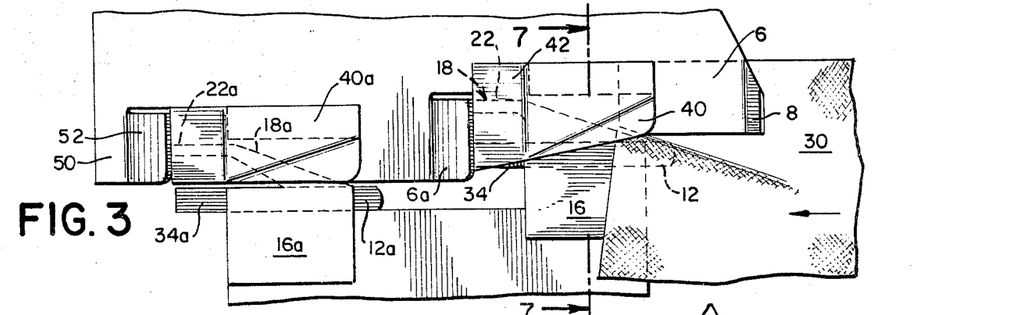
FIG. 3 is a plan view of the knife pleat making devices shown in FIG. 1 showing a workpiece entering the same.
Figure 4:
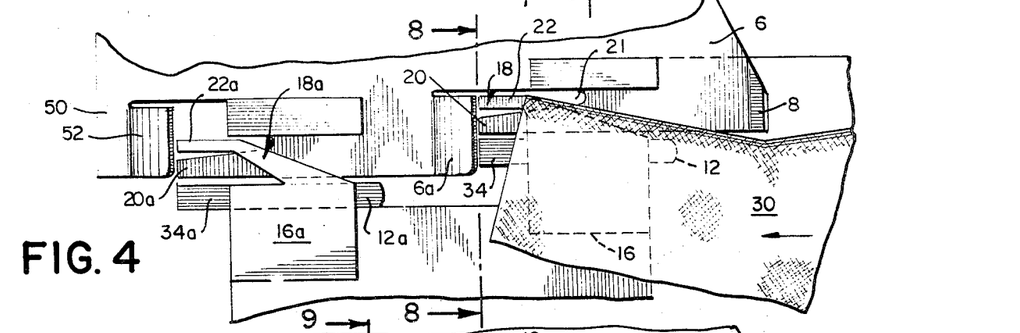
FIG. 4 is a view similar to FIG. 3 showing the workpiece further advanced through the device. In this view upper plates 40 and 40a are not shown so that the folding action on the workpiece can be seen.
Figure 5:
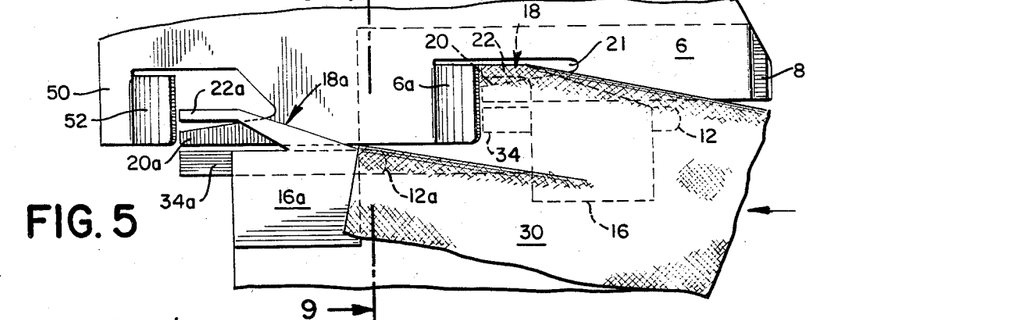
FIG. 5 is a view similar to FIG. 4 showing the workpiece through the first knife pleat making device and entering the second. Again upper plates 40 and 40a have been removed to show the movement of the cloth.
Figure 6:
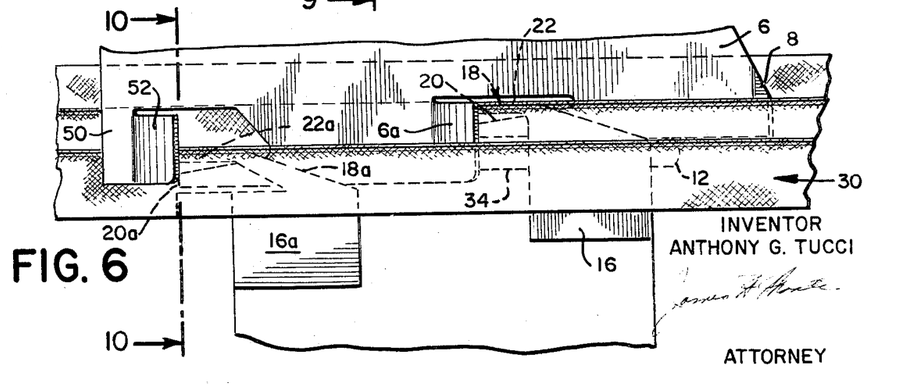
FIG. 6 is a view similar to FIG. 5 showing the workpiece through both knife pleat making devices and emerging from under an end of the presser plate and progressing toward the ironing element.
Figure 7:
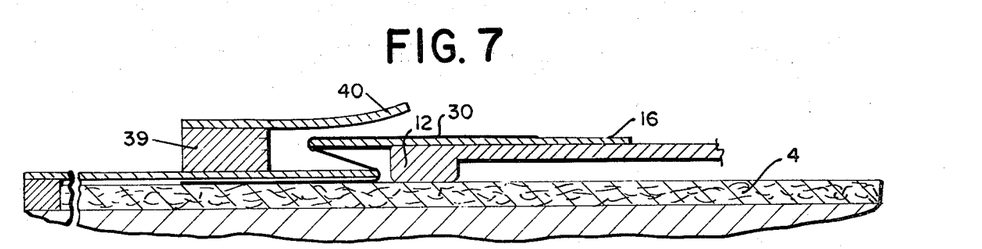
FIG. 7 is a sectional view taken along the line 7—7 of FIG. 3.

Referring to the drawings, the two knife pleat making devices 2 and 2a are arranged in series along the length of a continuous moving conveyor belt 4 driven by a motor (not shown). A clutch (not shown) is provided for engagement of the revolving shafts of the motor with the shafts of the wheels which drive the conveyor belt. The clutch is positioned beneath the work table over which the conveyor passes and is foot actuateable. A presser plate 6 having an upwardly extending leg 8 is provided in overlying relationship over a portion of the conveyor belt. This pressure plate serves to hold the portion of a workpiece not to be pleated against the conveyor belt so that it is carried by the conveyor belt. Positioned closely adjacent to the presser plate but not abutting the same is a leg 12 which, on its forward end, is upwardly beveled so as to lift an incoming workpiece off of the conveyor. At its rear edge the leg is downwardly beveled as seen in FIGS. 3–5 to permit the workpiece to gradually return onto the conveyor 4. Leg 12 supports plate 16 which is raised as seen in FIGS. 7–10 inclusive. Plate 16 is provided with a first finger 18 which extends beneath plate 40 and, as seen in FIG. 4, slopes downward at its rearward portion while over that portion of the conveyor belt on the same side as presser plate 6.

Figure 8:
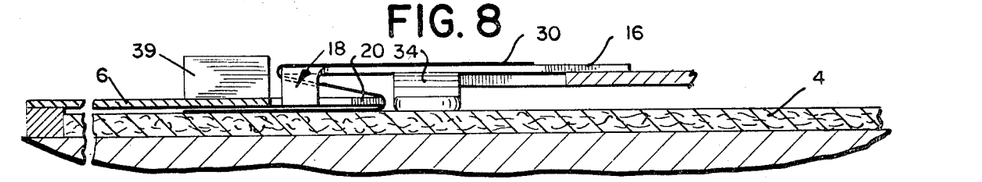
FIG. 8 is a sectional view taken along the line 8—8 of FIG. 4.

Presser plate 6 is provided with an extending or second finger 20 which is clearly visible in FIG. 8. This second finger 20 underlies the overlapping finger 18. The second finger 20 is formed by cutting out a generally triangularly shaped area 21 from presser plate 6.

Figure 1:
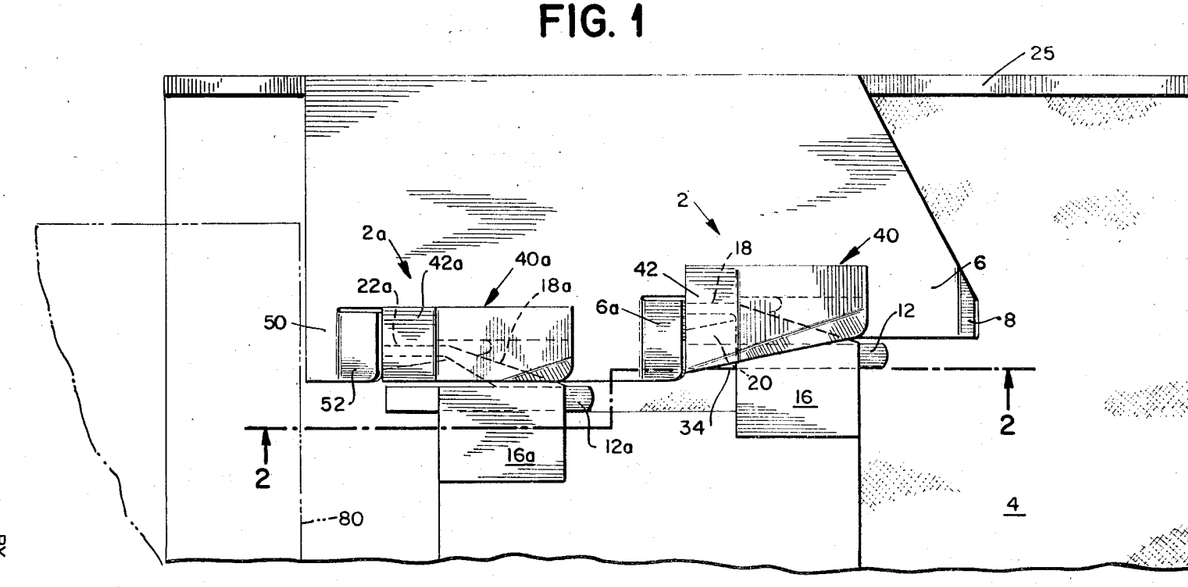
FIG. 1 is a plan view showing conveyor passing through a pair of knife pleat making devices and beneath an ironing element positioned at the left.

Positioned on top of plate 16 but not in abutting relationship thereto is plate 40 affixed to presser plate 6 by leg 39. Plate 40 tapers outwardly so that at its end toward ironing element 80 it overlies the downwardly sloping edge of the leg 12 although, it is to be understood, it need not do so. This plate 40 slopes downwardly, the slope beginning at about the same point as the downward slope of finger 18 begins. Thus, plate 40 and finger 18 are generally parallel in heights. Eventually plate 40 terminates just beyond fingers 18 and 20 and serves to hold a workpiece carried on the conveyor 4 until it passes beneath a second presser plate 6a as seen in FIG. 1.

The invention can be more readily understood by the following description of the operation of the device through the pair of serially arranged knife pleat making devices. In this description reference is made to FIG. 3–10 inclusive. In these figures the workpiece is shown in heavy black line to eliminate confusion with the moving conveyor which is also constructed of a fabric material. Conveyor 4 passing over a portion 25 of a work table carries the workpiece 30 into the statically positioned knife pleat making devices. The workpiece passes beneath lip 8 of presser plate 6. When the exposed portion of the workpiece reaches leg 12 having an upwardly sloping front face, it is raised as seen in FIG. 3. As the conveyor 4 moves, the workpiece moves over plate 16. Upward movement of the workpiece is restrained by the bottom surface of plate 4. It should be noticed that the device causes fabric to be drawn from one side of the workpiece while the other side, the side under the pressure plate 6, is firm between the presser plate 6 and the conveyor 4. As the conveyor 4 moves it carries the raised portion of the workpiece along the side edge of plate 16 and thence along the outer edge of finger 18 as it carries cloth beneath presser plate 6 and the extension or second finger 20. As the conveyor continues its travel in the indicated direction, the raised portion of the workpiece passes around the rearward portion 22 of finger 18 which runs generally parallel to leg 12 and slopes downwardly. It meets cloth emerging from under presser plate 6 and held by extension or second finger 20 where it is deposited. Assisting in bringing the raised portion of the workpiece downward is plate 40 provided with rearward portion 42, seen in FIG. 2, sloping downwardly and running generally parallel with finger 18. The cloth moves gradually downward from its raised positioned also by virtue of the rearward downwardly sloping face 34 of leg 12.

Figure 2:
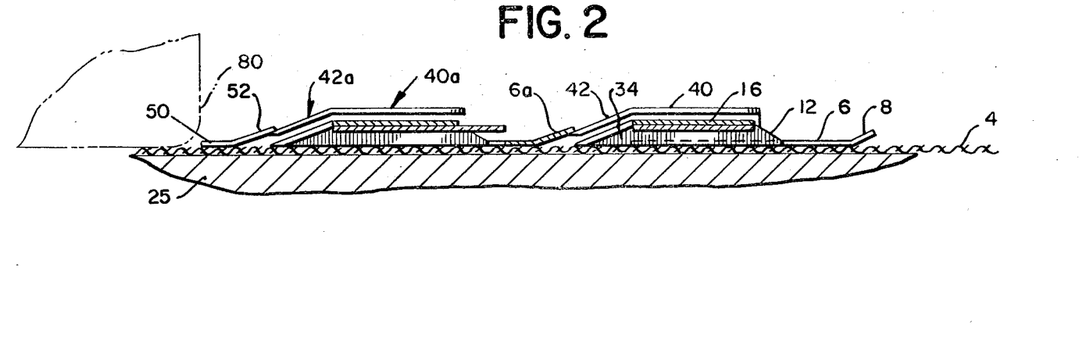
FIG. 2 is a sectional elevation of FIG. 1 taken along line 2—2 of FIG. 1.
Figure 9:
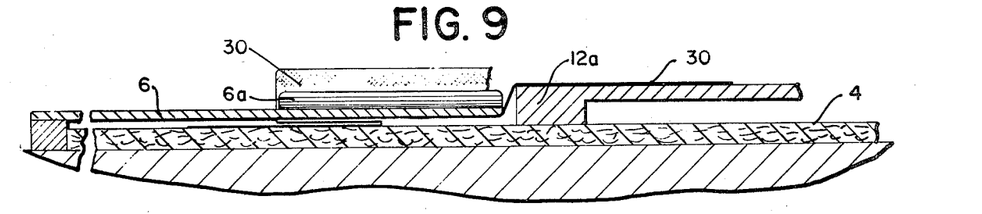
FIG. 9 is a sectional view taken along the line 9—9 of FIG. 5.
Figure 10:
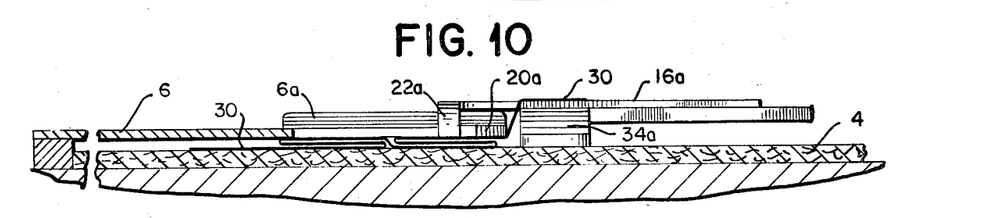
FIG. 10 is a sectional view taken along the line 10—10 of FIG. 6.
Figure 11:
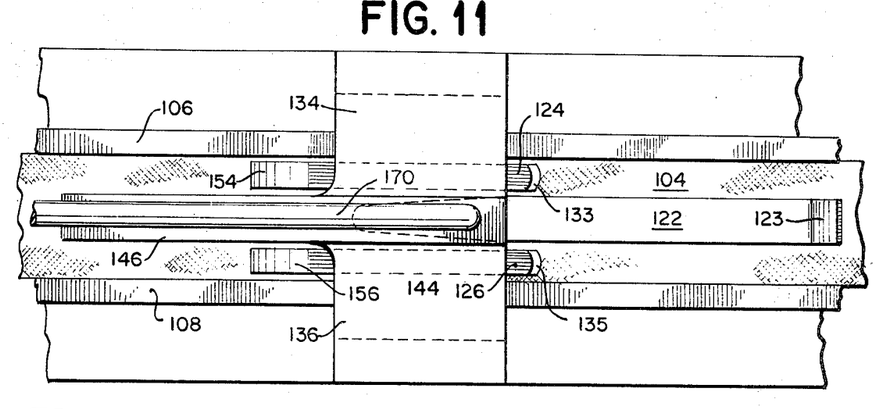
FIG. 11 is a plan view of a box pleat making device of the present invention.
Figure 12:
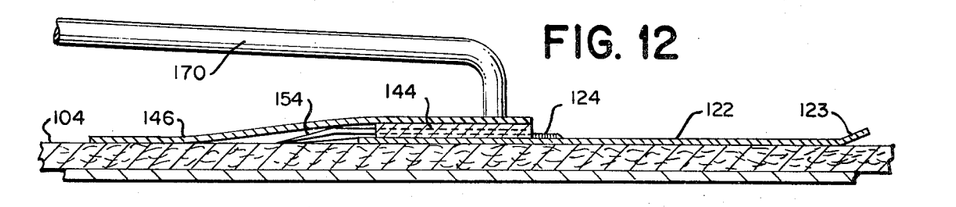
FIG. 12 is a sectional view taken along line 12—12 of FIG. 11.

In the embodiment shown, the workpiece which has been folded to form one pleat is thereafter passed into a second knife pleat maker similarly constructed but positioned closer toward the edge of the conveyor belt 4. This second knife pleat making device is similarly provided with a presser plate 6a adapted to receive and hold the singularly pleated workpiece 30 immediately after it emits from beneath fingers 18 and 20 and leg 12. The workpiece undergoes the same folding operations continuing to draw fabric from the left while holding the fabric on the right firm between the presser plate 6a and finger 20 on the top and the conveyor belt 4 on the bottom. When subsequent pleats are made, it should be observed, the portion of the workpiece which remains unpleated serves to carry a previously pleated workpiece as seen in FIG. 9 and 10. For convenience and to insure that the workpiece remains in pleated condition prior to entering the ironing element an end presser plate 50 having upwardly extending lip 52 is desirably provided. As seen in FIGS. 1 and 2, the pleated workpiece thereafter is carried on conveyor belt 4 beneath ironing element 80 which bears against the pleated fabric. The pleat is thus set by the ironing element 80 and becomes permanent. This ironing element can be removed by use of lifting means affixed thereto which are actuateable by a pedal positioned near the clutch pedal and beneath the front end of the work table 25. All that the operator need do is feed the workpiece beneath the first presser plate 6 and the balance of the operation is entirely automatic. Suitable means for stacking pleated fabrics can be provided downstream of the iron element such as that apparatus disclosed and claimed in my patent, U.S. Pat. 3,113,771.

The box pleat making device

The device for making box pleats is shown in FIGS. 14 to 17 inclusive. The device shown is operable to form a single box pleat, it being understood that several of these box pleat making devices arranged side by side using a common conveyor can be used to form the desired number of box pleats and the present invention should not be limited thereby. The box pleat making device, as indicated above, utilizes a conveyor to move a cloth workpiece therethrough. The device, in the embodiment shown, has no movable parts aside from the conveyor belt. When the folded cloth emerges from the device it is carried by the conveyor beneath the ironing element shown in FIGS. 1 and 2. It can then be taken up utilizing the stacking device disclosed and claimed in my U.S. Pat. 3,113,771.

The device is generally designated by reference numerals 100 and rests upon or is affixed to work table 102 similar to or identical to work table 25 shown in FIGS. 1–10 inclusive. Over the worktable passes a conveyor belt 104 constructed of a suitable coarse material which is resistant to the heat of the ironing element. This conveyor belt in these drawings is designated by reference numeral 104 to facilitate understanding the invention, it being understood that the knife pleat making device and the box pleat making device are interchangeable over the same conveyor belt. The conveyor belt is shown riding between a pair of runners 106 and 108. These runners or guide members are positioned on opposite sides of the conveyors. Naturally when a wider conveyor is employed to accommodate 2, 3, 4, or 5 or more pleating devices the runners are spaced farther apart. Overlying the conveyor belt is a presser plate 122 adapted to hold a portion of the incoming fabric against the conveyor. Fabric not so held is permitted to undergo a folding action in response to the arrangement of the parts of the device. Rearward of presser plate 122 are a pair of generally parallel legs 124 and 126 positioned generally parallel to presser plate 122 but not in abutting relationship thereto. The legs 124 and 126 and the presser plate 122 are separated by spaces, the width of which is determined by the type of cloth to be pleated. Generally, it is about 1/32 inch. Presser plate 122 is rearwardly forked forming prongs 128 and 130 defining a generally U-shaped slot 132. Each leg 124 and 126 is provided with an upwardy bevelled face 133 and 135 which serve to enable the incoming cloth workpiece to be raised off the conveyor. Overlying legs 124 and 126 is plate 134 which extends over presser plate 122 on one side of the device. On the other side of the device is plate 136 which has been removed from FIG. 13 as shown. These plates 134 and 136 are secured to legs 124 and 126. Rearwardly thereof and integral therewith are downwardly and inwardly sloping fingers 140 and 142 which terminate in an almost knife edge as they abut the conveyor belt and cross over the fingers 128 and 130 which similarly have almost knife edges at their end. Atop the rearward end of the presser plate 122 opposite its front upwardly extending foot 123 is a block 144 which serves to maintain presser plate 122 against conveyor belt 104. Affixed to block 144 is rear presser plate 146 which is affixed to block 144 by suitable rivets or screws 148 and 150. Presser plate 146 slopes downwardly until it abuts conveyor belt 104 rearward of the end of fingers 128, 130, 140, and 142 serving to hold the pleated fabric in pleated condition until it is carried beneath the ironing element where the pleat is set.

Figure 13:
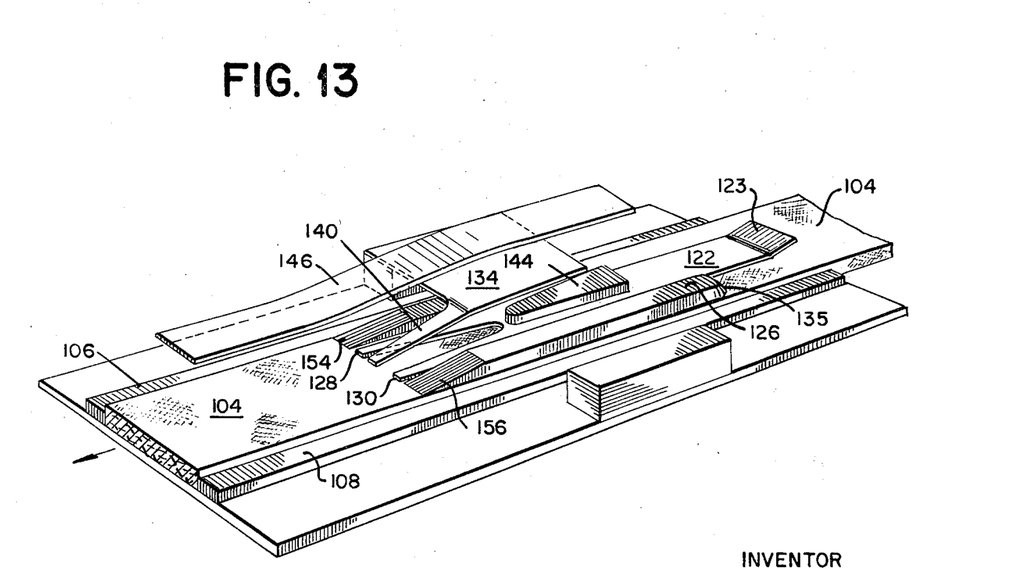
FIG. 13 is an exploded view of the device of FIG. 11 but the lower plate 136 has been removed so as to expose the finger arrangement therebeneath.

Legs 124 and 126 terminate rearwardly of plates 134 and 136 and each is provided with a rearward downwardly beveled face 154 and 156 which ends even with the almost knife ends of fingers 128, 130, 140, and 142 as seen in the perspective view of FIG. 13.

Figure 14:
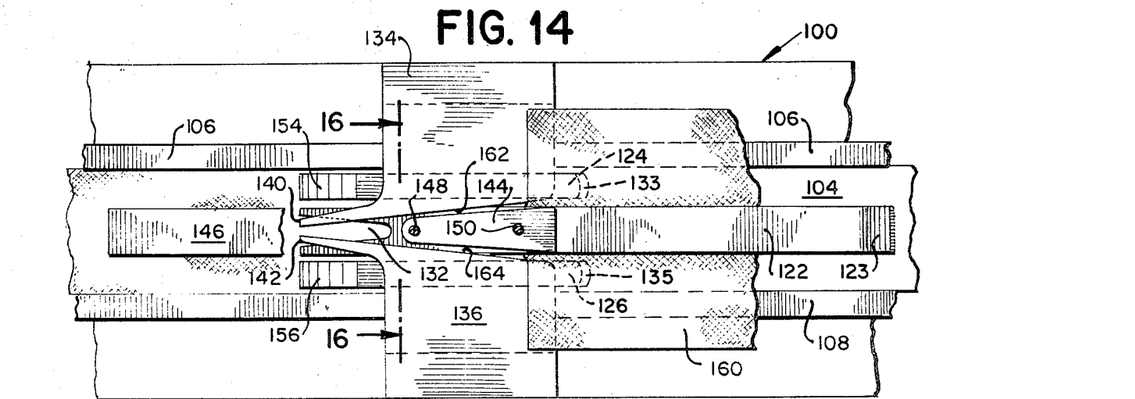
FIG. 14 is a plan view similar to FIG. 11 showing the conveyor moving a workpiece through the device.
Figure 15:
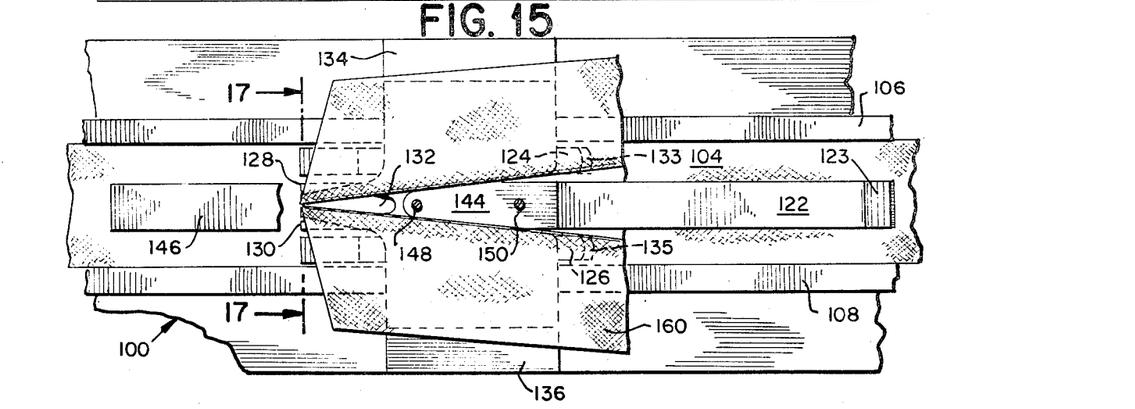
FIG. 15 is a view similar to FIG. 14 showing the workpiece advanced further through the device. In this view plate 130 has been removed to show the folding of the workpiece accomplished by the present device.
Figure 16:
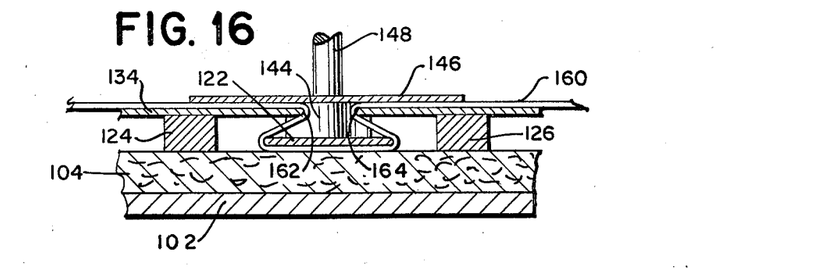
FIG. 16 is a sectional view taken along line 16—16 of FIG. 14 with portions left out for purposes of clarity.
Figure 17:
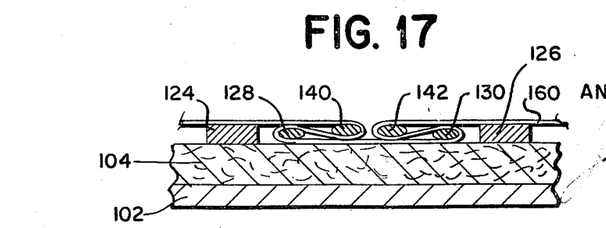
FIG. 17 is a sectional view taken along line 17—17 of FIG. 15 with portions left out for purposes of clarity.
Figure 18:
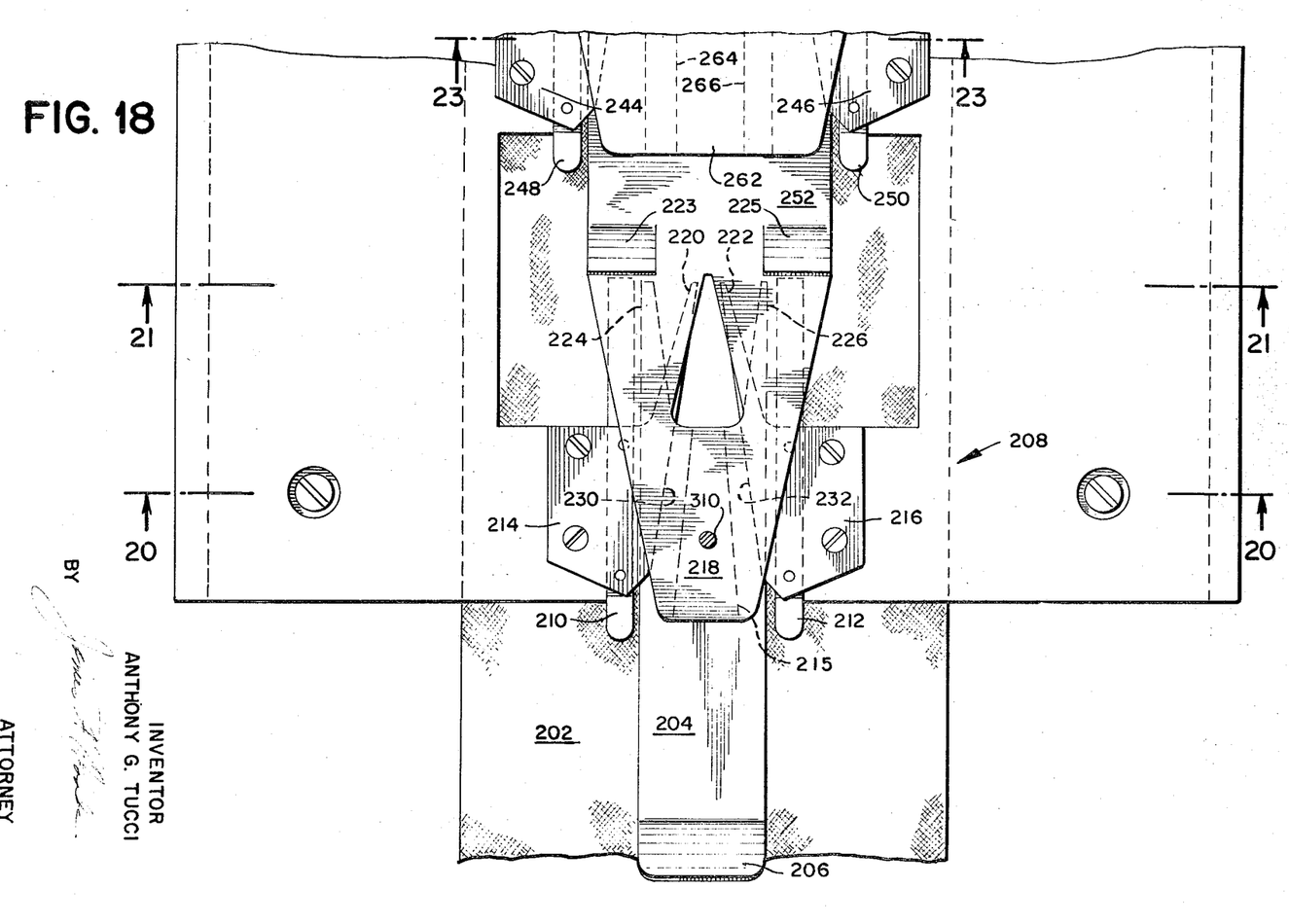
FIG. 18 is a plan view of the front portion of a multiple pleat making device pursuant to the present invention.
Figure 19:
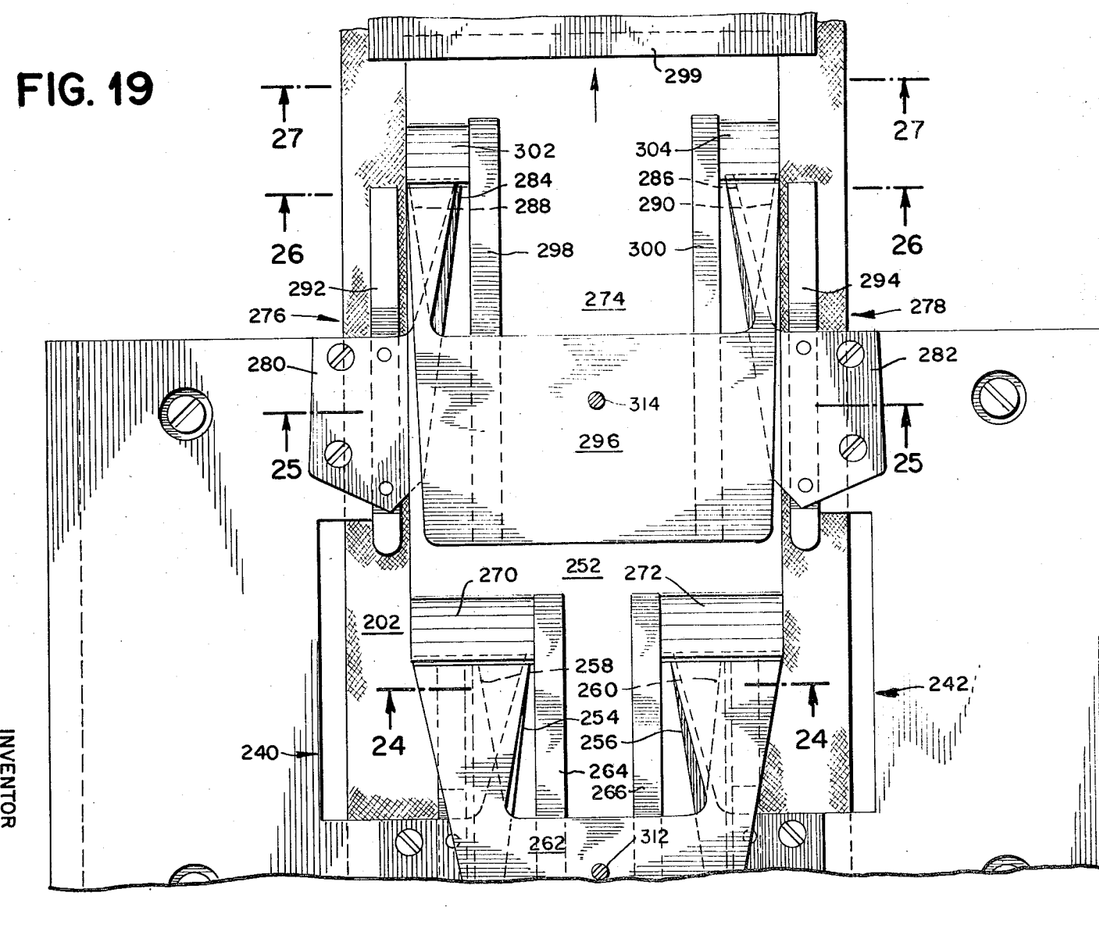
FIG. 19 is a plan view of the rear portion of the same multiple pleat making device whose front portion is shown in FIG. 18.
Figure 20:
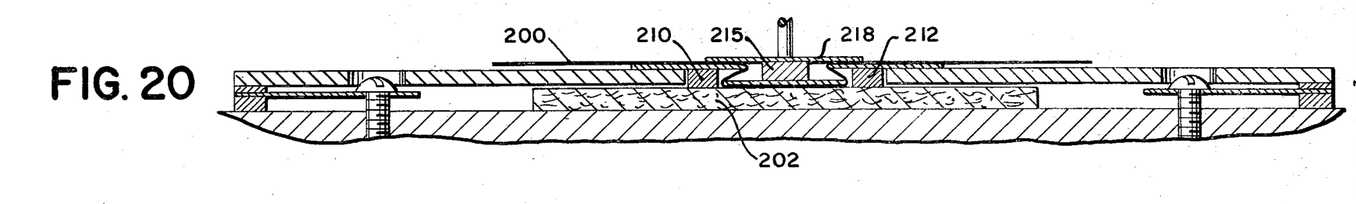
FIG. 20 is a sectional view taken along the line 20—20 of FIG. 18.
Figure 21:
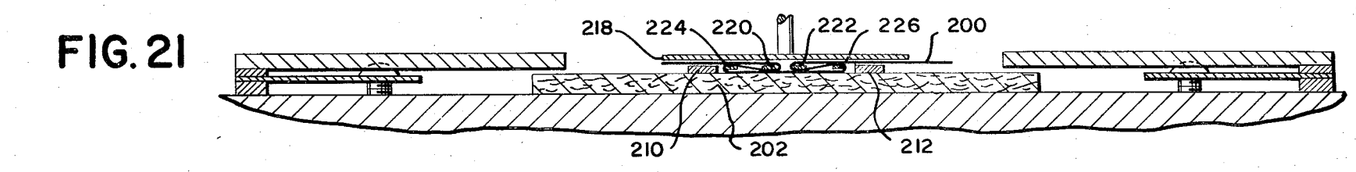
FIG. 21 is a sectional view taken along the line 21—21 of FIG. 18.
Figure 22:
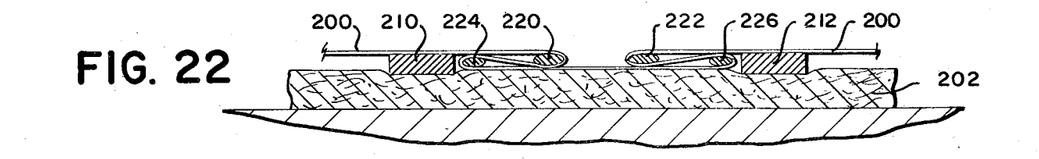
FIG. 22 is a view similar to FIG. 21 but magnified for purposes of clarity. Some elements have been left out of this figure.
Figure 23:
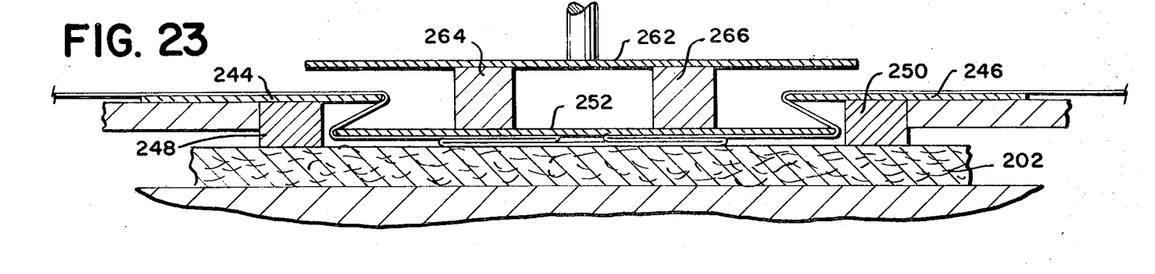
FIG. 23 is a sectional view taken along line 23—23 of FIG. 18.

Box pleats are formed very readily employing the present device. The workpiece 160 is placed on the moving conveyor belt 104 ahead of presser plate 122. The conveyor belt 104 carries the workpiece 160 beneath front foot 123 and thence beneath presser plate 122 itself. The plate has the width of the pleat itself. The conveyor then carries the workpiece 160 past the front faces 133 and 135 of legs 124 and 126 serving to raise the workpiece upwards and over plates 133 and 135 as seen in FIG. 14 in plan and FIG. 16 in section. The conveyor continues to carry the workpiece, the middle unraised section thereof being held firmly against the conveyor belt 104 first by presser plate 122 and subsequently, as the workpiece progresses, by prongs 128 and 130. The edges 162 and 164 of plates 133 and 135 come close to but do not abut block 144. The workpiece 160 passes along the edges 162 and 164 and over plates 134 and 136. Plates 134 and 135 terminate in downwardly and inwardly sloping fingers 140 and 142. The advancing workpiece 160 passes down over edges 162 and 164 of these fingers 140 and 142 until the cloth meets cloth emerging from beneath fingers 128 and 130 and carried on conveyor belt 104. At that point the box pleat is formed, a continuous pleat being made by continuously feeding a workpiece beneath front foot 123 and presser plate 122 and continuously moving conveyor belt 104 in the indicated direction.

When the pleated workpiece emerges it is held in pleated condition by virtue of the downwardly sloping rear presser plate 146 which has a width at least about that of presser plate 122. This rear presser plate 146 holds the workpiece in pleated form until it is carried to the entrance of the iron element abutting conveyor belt 104 where the pleat is set.

In a preferred embodiment of the present invention, an arm 170 is provided and is affixed at one end to the ironing element and on the other end to a suitable portion of the pleat making device to enable one to locate the pleat making device with respect to the ironing element. Suitably, the arm 170 is attached to the block 144 through a portion of rear presser plate 146. Desirably this arm and the receiving connection in the pleat making device are such as to permit removal of the pleat making device from the arm and insertion on the arm of another cloth folding device.

The devices shown in the present invention are capable of numerous variations and they can be used in various different and useful combinations with one another. For instance, with respect to the knife pleat making device, instead of having a plurality of pleats run the same way one can form one pleat running or facing in one direction and the second in the opposite direction, i.e., the pleats could be face to face or back to back instead of face to back. When a pair of closely facing pleats are desired the box pleat making device is employed because, while on the bottom of the workpiece fed therethrough there is formed a box pleat, the top of the workpiece forms facing knife pleats. Thus this embodiment can be used in one form for two distinctly different purposes.

Additionally, using the device of the present invention it is possible to pleat a workpiece wherein there are 6 pleats, 3 of which face on the same side of the cloth and face the same direction, the balance being on the other half of the cloth width and facing the first mentioned pleats. This is done, for instance, by utilizing the pleat-forming device shown in FIGS. 11-17 together with two pairs of knife pleat-making devices as shown in FIGS. 1-10. They are arranged in a V shape with the device of FIGS. 11-17 at the intersection of the legs of the V and the other devices positioned rearwardly with respect thereto. In this instance more conveyor belt space or lead is needed from the operator to the ironing element to accommodate these devices and, of course, the conveyor belt is wider. Preferably a common conveyor belt is utilized to carry the workpiece through the various pleat forming devices.

The speed at which pleats can be made using the present devices is phenomenal. By using these static forming elements, it is possible to operate as high as 300 feet per minute. The speed at which the workpiece moves through the devices and through the ironing element is generally limited only by the operator's efficiency. While some cloths require a longer residence time than others beneath the ironing element, this can be provided without decreasing the speeds at which the conveyor belt and thus the workpiece move by providing a longer work table and a longer ironing element.

With respect to the two serially arranged knife pleat devices shown in the drawings and described above, a pleat making unit can be rendered ineffective for making a pleat whereby the total number of pleats imparted to the workpiece is decreased merely by removing the leg on which rests the plate provided with the inwardly and downwardly sloping finger terminating in a knife edge. The cloth will pass through this position without undergoing any folding action until it comes in contact with the next pleat forming device which has its leg and plate in operative position. Similarly, a rearwardly disposed pleat making device can be rendered inoperative by removing this same part from the apparatus. This same principle applies to inverted pleat making devices such as that described above or to combination apparatuses such as the variable pleat making device described below.

Described below is a device according to this invention which can be used to make from one to six pleats depending upon the presence or absence of the leg and plate numbers below. In this device, the shroud or cover plate of a first pleater acts as the pressure plate for a second pleat forming device although it is to be understood that this feature, while preferred, is not essential for the operation of this advanced embodiment of the invention.

Variable multiple pleater

A pleating apparatus which has interchangeable pleat forming devices therein is illustrated in FIGS. 18 to 28 inclusive. Essentially it comprises a box pleat making device as illustrated in FIGS. 11-17 which device also makes inverted pleats depending upon which side of the workpiece is upwards when the workpiece passes through the device. The multiple pleater of FIGS. 18 to 28 also comprises four knife pleat making devices as illustrated in FIGS. 1 to 10 inclusive, two of which are the inverse of the pleat forming device of FIGS. 1 to 10 in that the pleat is formed by drawing cloth from the right side. The multiple pleater comprises these five devices arranged in a V-shape with the box or inverted pleater the apex of the V and closest to the operator. Positioned rearwardly of the inverted pleater are a pair of knife pleat making devices. These are positioned outside of the inverted pleat making device. The knife pleater on the left side is substantially the same as the first knife pleater shown in FIGS. 1 through 10. The knife pleater on the opposite side, i.e., the right side of the V is the converse of the first knife pleater in that it draws cloth from the left and forms the pleat on its left side. A second pair of facing knife pleat making devices is provided rearwardly and outside of both of the first pair of knife pleat making devices, thus completing the V. The knife pleat making device on the right is substantially the same as that shown in FIGS. 1 through 10 while the knife pleating device on the left is the converse thereof. A common presser plate cut out to accommodate the fingers is employed. Additionally, at several locations there are upwardly extending lips integral therewith to assist fabric in passing under the plates. For purposes of discussion, various portions of the plate are given different reference numerals below.

The device is so constructed that the top plate of the inverted pleat guides the workpiece which is pleated into an inverted pleat into the first pair of knife pleating devices. It should be noticed that instead of employing two top plates one each for the knife pleat making device of the pair, that a common outwardly flaring plate is employed. This plate also slopes downwardly much like plate 40 in FIGS. 1 through 10 and guides the pleated fabric into the second pair of knife pleating devices in the same general manner as the single device of FIGS. 1 through 10 feeds the workpiece into a second serially positioned pleat forming device. The second pair of knife pleat forming devices functions the same as the first pair.

A common upper plate is provided with rearwardly sloping arms. These arms assist in preventing the workpiece from bunching and also help to direct the workpiece in fully pleated condition to the ironing element.

Figure 24:
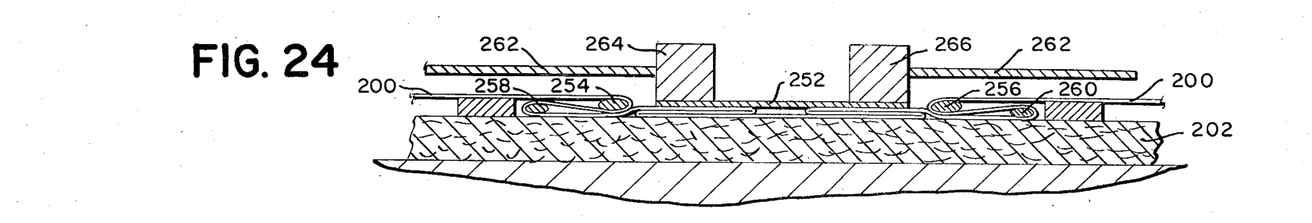
FIG. 24 is a sectional view taken along the line 24—24 of FIG. 19.
Figure 25:
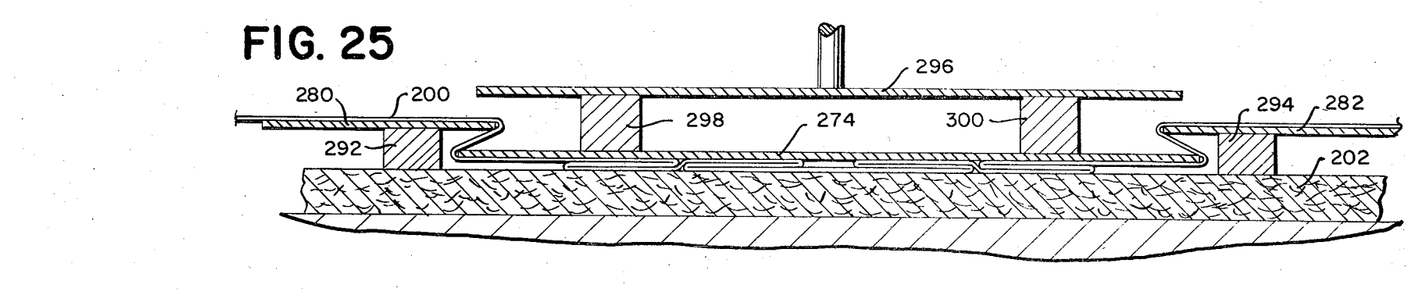
FIG. 25 is a sectional view taken along the line 25—25 of FIG. 19.
Figure 26:
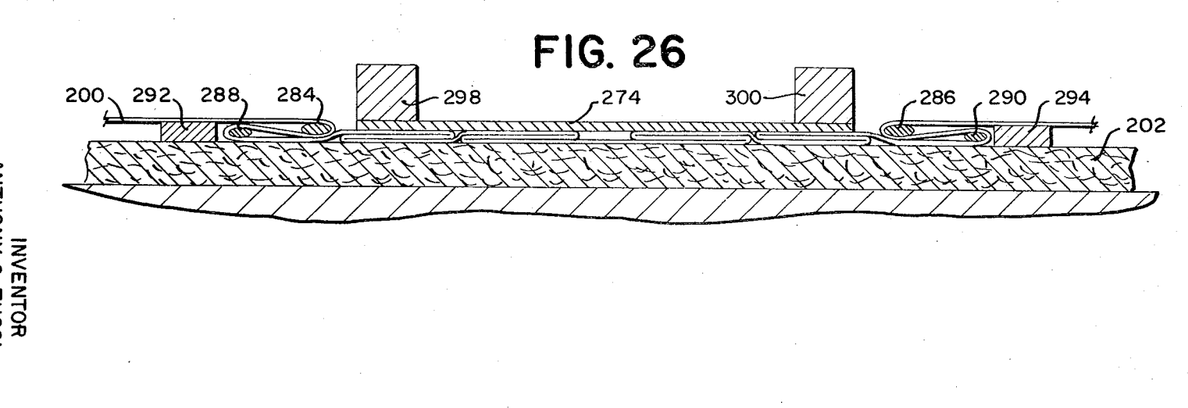
FIG. 26 is a sectional view taken along the line 26—26 of FIG. 19.

Since the various separate components of the variable multiple pleater have been discussed in detail above with reference to the devices of FIGS. 1 through 10 and 11 through 17, discussion of this embodiment will be limited for purposes of brevity to a description of its operation. Referring to FIGS. 18 through 28, a workpiece 200 carried on conveyor 202 passes beneath presser plate 204 provided with an upwardly extending front lip 206. The workpiece is carried through the inverted pleat forming device 208 passing over legs 210 and 212 each having a beveled front edge. The workpiece moves over plates 214 and 216 beneath cover plate 218 supported on element 215 positioned between plates 214 and 216 and on plate 204. Plates 214 and 216 terminate in downwardly and inwardly sloping fingers 220 and 222 which cross over the fingers 224 and 226 which form the rearward portion of presser plate 204. Fingers 220, 222, 224, and 226 terminate in knife edges. The workpiece is caused to move under presser plate 204 in the middle as it is carried by conveyor belt 202 but over plates 214 and 216, creases being formed by virtue of edges 230 and 232 of plates 214 and 216. When the workpiece emerges from beyond fingers 220, 222, 224, and 226 it has an inverted pleat therein. It is guided on the top by top plate 218 into the first pair of facing knife pleat forming devices 240 and 242 via upwardly extending lips 223 and 225 integral with plate 252. Devices 240 and 242 are provided with plates 244 and 246 each supported by a leg 248 and 250. Plates 244 and 246 extend over plate 252 which functions to hold the portion of the workpiece already pleated firmly against conveyor belt 202 so that it is carried by the conveyor belt. Plates 244 and 246 terminate in inwardly and downwardly sloping fingers 254 and 256 which cross over the forked fingers 258 and 260 which comprise the rear portion of plate 252. A cover plate 262 supported by members 264 and 266 is provided to keep the workpiece over the plates 244 and 246. This cover plate 262 runs generally parallel to the pleated workpiece emerging from beyond fingers 254, 256, 258, and 260 beneath upwardly extending lips 270 and 272. The rearward portion of plate 262 is forked as seen in FIG. 24. These lips are integral with presser plate 274.

When the workpiece passes through knife pleat making devices 240 and 242 cloth is drawn from either side into a pair of facing pleats outside of the inverted pleat already formed in the workpiece. The cloth is drawn over the fingers 254 and 256 while fingers 258 and 260 integral with plate 252 hold the previously pleated workpiece against conveyor 202.

Figure 27:
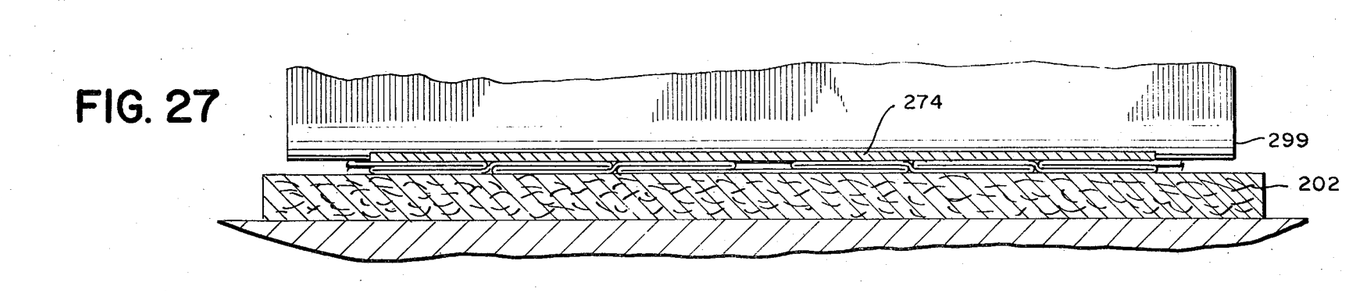
FIG. 27 is a sectional view taken along the line 27—27 of FIG. 19.
Figure 28:
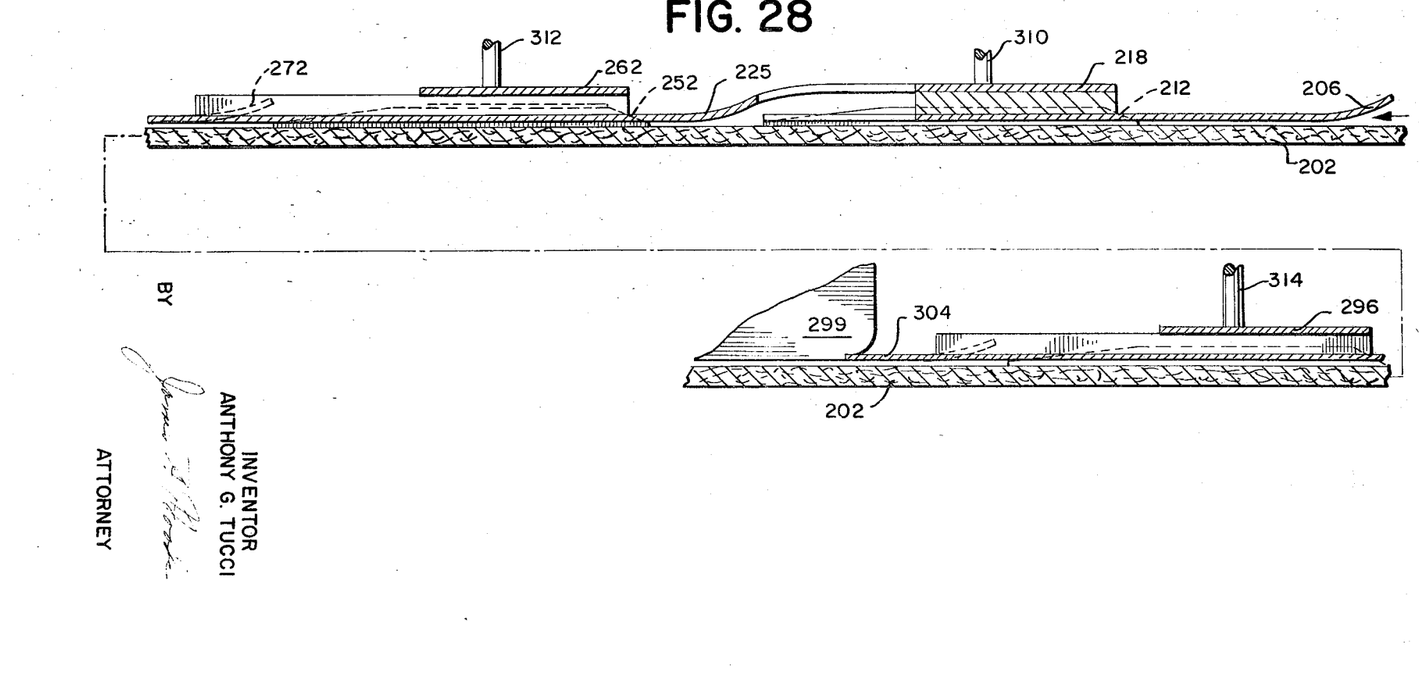
FIG. 28 is a sectional view taken along a line drawn lengthwise through the middle of the device shown in FIGS. 18 and 19. The fingers have been left out for purposes of clarity and understanding.

The workpiece thence passes beneath plate 274 which holds the four pleats in pleated condition against conveyor 202. Workpiece material on either side of the pleats passes through knife pleat forming devices 276 and 278 similarly provided with plates 280 and 282 on either side terminating in inwardly and downwardly sloping fingers 284 and 286 which cross over extension fingers 288 and 290 of plate 274. Plates 280 and 282 are supported by legs 292 and 294 provided with upwardly beveled front lips, said legs being gradually sloping downward at their rear extremities. A cover plate 296 supported by members 298 and 300 is provided to keep the workpiece raised over the conveyor generally parallel to the workpiece therebeneath. This cover plate 296 also functions to direct the pleated workpiece beneath upwardly extending lips 302 and 304 which are integral with the rear portion of plate 274. The workpiece receives two additional pleats facing one another as it passes through these devices 276 and 278. The result is shown in FIG. 27, i.e., six pleats, a pair of three on either side of the workpiece facing the other pair. The workpiece is then carried by the conveyor belt beneath a suitable ironing surface of ironing element 299 where the pleats are set.

The various plates having fingers can be attached to supporting members by screws or other suitable fastening means. These in turn can be affixed to other members using larger screws as shown although the manner in which the plates are supported in operative position is not critical. These plates can be welded or affixed by pins or the like to the various leg members employed.

The multiple pleater shown in FIGS. 18 through 28 can be varied by removing a pair of pleat forming devices or by removing a single pleat forming unit or simply, by removing the leg and plate affixed thereto thereby rendering the device inoperative to form the pleat by use of positioning rods 310, 312, and 314 which are positioned in the middle of the respective cover plates and affixed to the iron to hold the devices relatively stationary during use.

Additionally, the device can be varied, as indicated above, to add on additional pleat making units or other fabric folding devices. With respect to the pleat making units themselves, they can be varied to increase or decrease the depth of the pleats so formed by regulating the distance the elevated fingers extend over the unraised portion of the workpiece. Deeper pleats result if the finger extends further over the unraised portion of the workpiece. Conversely, if the distance is less than that depicted in the present drawings, the pleat depth is decreased.

The distance between pleats can be readily regulated merely by the relative spacings of the pleat forming units employed. The further the subsequent pleat making units are spaced from an imaginary line drawn through the entire unit bisecting the first pleater unit, the further apart will be the pleats in a workpiece passed therethrough.

The instant invention can be applied to all types of fabrics regardless of whether the yarn of the fabric is natural, synthetic, or mixed. The fabric can have substantially any normal width. It should be stated, however, that the temperature of the ironing element shall be adjusted in accordance with the fabric being pleated.

From the foregoing it is apparent that the present invention accomplishes all of the objects set forth above in a single and highly economical manner. The devices of the present invention can be readily constructed of readily available material. If desired, the device can be used employing the conveyor belt assembly disclosed in my U.S. Pat. 3,107,447.

The terms and expressions used herein have been used for purposes of illustration and not of limitation as there is no intention, in the use of such terms and expressions, of excluding any equivalents, or portions thereof, as various modifications and departures are possible.

What is claimed is:

1. A device for forming at least one pleat in a workpiece which comprises a workpiece presser plate adapted to overlie a portion of a conveyor belt passing through said device and carrying a workpiece to be pleated, said presser plate adapted to prevent a portion of said workpiece from becoming pleated, means for lifting a portion of said workpiece off said conveyor, means for forcing the lifted portion of said workpiece over the portion of said workpiece carried on said conveyor against which said presser plate bears, means for keeping said lifted portion of said workpiece in a generally planar position relative to said conveyor and said portion of said workpiece carried on said conveyor, means for maintaining a crease between said portion of said workpiece carried on said conveyor and said lifted portion of said workpiece, and means for placing said lifted portion over the unlifted portion in surface-to-surface relationship.

2. A device according to claim 1 wherein said means for lifting a portion of said workpiece off said conveyor comprises at least one upwardly beveled leg positioned against said conveyor, said leg running the major portion of the length of said device and at its opposite ends being downwardly beveled, said means for keeping said lifted portion of said workpiece in a generally planar position comprises a generally horizontal plate, said means for forcing the lifted portion of said workpiece over the portion of said workpiece carried on said conveyor comprises at least one first finger affixed to one of said plates and extending over the portion of said workpiece carried on said conveyor beneath said presser plate and being downwardly sloping to said portion of said workpiece carried on said conveyor, said means for maintaining a crease comprises at least one second finger extending from said presser plate in generally the same direction as said presser plate and said first finger overlaps said second finger.

3. A device according to claim 2 wherein a plate overlies said first finger and said second finger and slopes rearwardly downward generally parallel to said first finger.

4. A device for forming knife pleats in a workpiece comprising a workpiece presser plate adapted to overlie a portion of a conveyor belt passing through the device and carrying workpiece to be pleated, said presser plate adapted to prevent a portion of the workpiece from becoming pleated, an upwardly beveled leg positioned against said conveyor for lifting a portion of said workpiece off said conveyor, said leg running the major portion of the length of said device and at its opposite end being downwardly beveled, said leg supporting a generally horizontal plate, a first finger affixed to said plate extending over the portion of said workpiece carried on said conveyor beneath said presser plate and being downwardly sloping to said portion of said workpiece carried on said conveyor, a second finger extending from said presser plate in generally the same direction and bearing against workpiece therebeneath, said first finger overlapping said second finger, a plate overlying said first finger and said second finger and rearwardly sloping downward generally parallel to said first finger.

5. A device for forming box pleats and inverted pleats which comprises a presser plate adapted to overlie a portion of a conveyor belt passing through said device and define an area on either side thereof which is open, said conveyor belt adapted to carry a workpiece to be pleated, a pair of upwardly beveled legs on either side of said presser plate positioned against said conveyor for lifting a portion of said workpiece off said conveyor on both sides of said presser plate, said legs running the major portion of the length of said device and at their opposite end being downwardly beveled, said legs each supporting a generally horizontal plate, a pair of first fingers affixed to the plates extending over the portion of said workpiece carried on said conveyor beneath said presser plate and being downwardly and inwardly sloping to said portion of said workpiece carried on said conveyor, a pair of second fingers extending from both sides of said presser plate in generally the same direction and bearing against said workpiece therebeneath, said first fingers overlapping said second fingers, a plate overlying said first fingers and said second fingers and rearwardly sloping downward generally parallel to said first fingers.

6. A device for making a plurality of pleats in a workpiece comprising a plurality of the devices of claim 3 arranged on a common presser plate.

7. A device for making from one to six pleats in a workpiece comprising a common presser plate and about said presser plate a plurality of the knife pleat making devices of claim 4 arranged in a generally V shape with the apex of the V facing the oncoming conveyor belt.

8. A device according to claim 7 wherein the pleat making device is the apex of the V in the device of claim 7 and a portion of each pleat making device can be removed to render that device inoperable.

References Cited

UNITED STATES PATENTS

| | | | |
|---|---|---|---|
| 1,402,584 | 1/1922 | Elrod | 223—34 |
| 1,702,271 | 2/1929 | Rosenbaum et al. | 38—10 |
| 2,070,996 | 2/1937 | Meyer | 38—10 |
| 2,830,401 | 4/1958 | Davies et al. | 223—34 |
| 3,107,447 | 10/1963 | Tucci | 38—10 |

MERVIN STEIN, Primary Examiner

G. V. LARKIN, Assistant Examiner